United States Patent [19]
Borba

[11] Patent Number: 5,384,994
[45] Date of Patent: Jan. 31, 1995

[54] ENERGY PAY BACK BUILDING

[76] Inventor: Paul A. Borba, 311 E. Glen Cove, Mesa, Ariz. 85201

[21] Appl. No.: 33,275

[22] Filed: Mar. 16, 1993

[51] Int. Cl.⁶ ............................................. E04B 5/48
[52] U.S. Cl. ..................................... 52/261; 52/235; 52/745.1
[58] Field of Search ...................... 52/261, 309.11, 300, 52/404, 407, 408, 235, 745.1; 126/623

[56] References Cited

U.S. PATENT DOCUMENTS

| | | | |
|---|---|---|---|
| 1,402,077 | 1/1922 | Lanchester | 52/2.14 |
| 2,027,882 | 1/1936 | Ross | 52/235 |
| 2,030,668 | 2/1936 | Weyerhaeuser et al. | 52/407 |
| 2,893,075 | 7/1959 | Potchen et al. | 52/823 |
| 3,462,897 | 8/1969 | Weinrott | 52/309.11 |
| 3,785,103 | 1/1974 | Turner | 52/309.11 |
| 3,808,761 | 5/1974 | Green et al. | 52/300 |
| 3,905,171 | 9/1975 | Cargill et al. | 52/800 |
| 3,969,860 | 7/1976 | Bentley | 52/261 |
| 4,068,434 | 1/1978 | Day et al. | 52/309.11 |
| 4,571,909 | 2/1986 | Berghuis et al. | 52/426 |
| 4,578,909 | 4/1986 | Henley et al. | 52/90 |
| 4,726,985 | 2/1988 | Fay et al. | 52/404 |
| 5,117,811 | 1/1992 | Taylor | 126/623 |
| 5,134,831 | 8/1992 | Avellanet | 52/408 |

FOREIGN PATENT DOCUMENTS 1401266  4/1965  France ............................. 52/648.1

Primary Examiner—James L. Ridgill, Jr.
Attorney, Agent, or Firm—Robert A. Parsons; Don J. Flickinger

[57] ABSTRACT

A shelter which repays its construction costs in energy savings over a period of five to seven years. Except for entryways, the shelter is enclosed and has no vented attic or similar spaces below its roof. Roof and walls are skin-stressed panels having a closed cell insulation core between selected structural facings, for example steel. Interior insulation is at the walls and the roof line. Any ceiling below the insulated roof line is at nominal room temperature. Natural lighting enters the shelter via sun-tracking, sun-reflecting skylights. Preferable a plurality of air conditioners, concentric about the skylights, heats and cools the interior of the shelter. An energy program manager monitors and controls electrical usage. The shelter lends itself to many building types and functions.

Those skilled in the art will conceive of other embodiments of the invention which may be drawn from the disclosure herein. To the extent that such other embodiments are so drawn, it is intended that they shall fall within the ambit of protection provided by the claims herein.

19 Claims, 6 Drawing Sheets

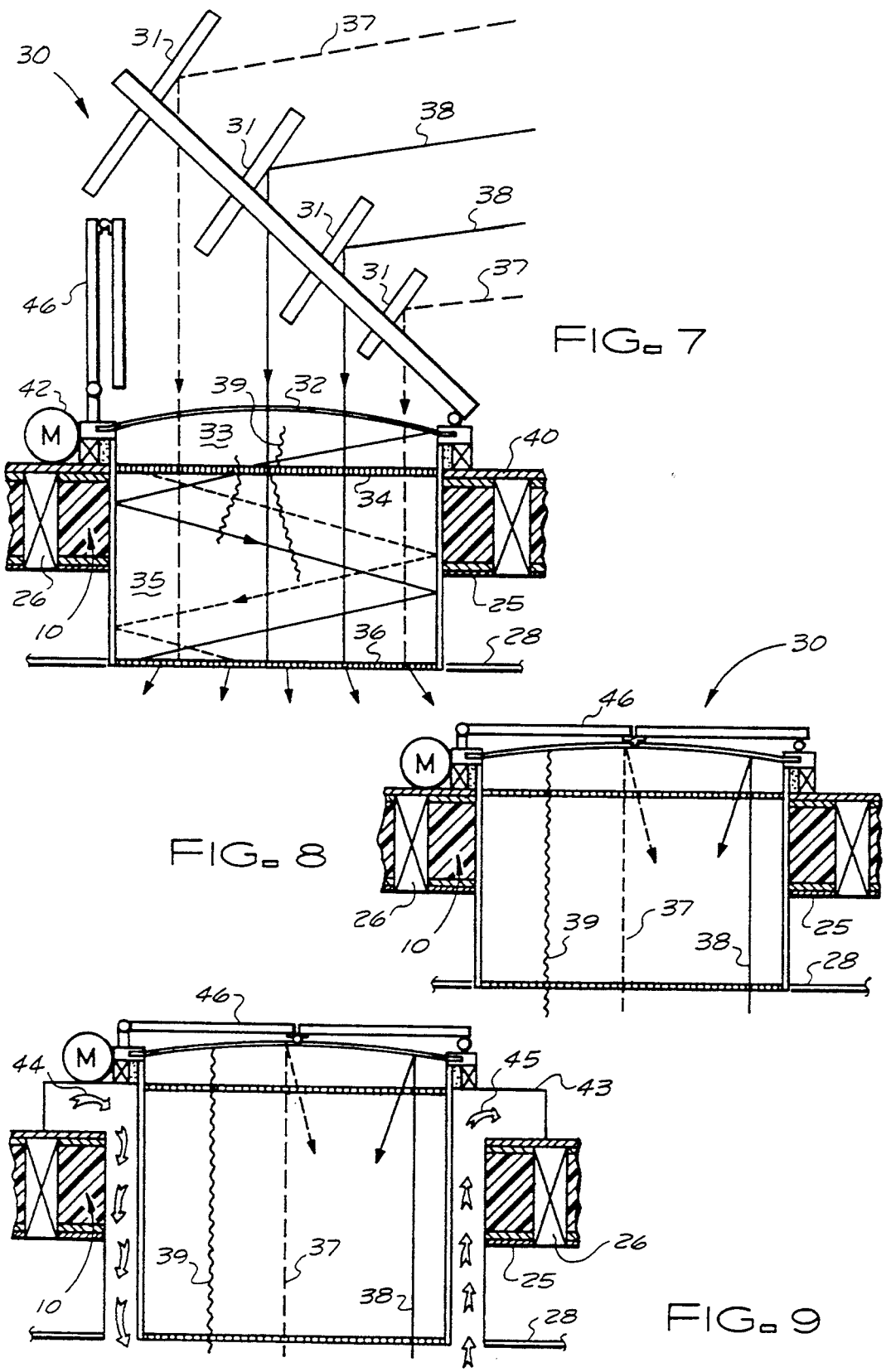

ENERGY PAY BACK BUILDING

BACKGROUND

Technical Field of the Invention

Building construction technology and systems. In particular, the invention relates to building technology which, when practiced, produces a building which is so functionally efficient that savings in operational energy costs will repay the cost of erection of the building within a few years after the useful life of the building begins.

Prior Background Art

One of the primary needs of mankind is shelter. Mankind probably first sought shelter beneath bushes, brush, and trees. Caves offered better, more protective shelters; and, with the discovery of fire a cave could be provided with some light as well as warmth.

Man's need for shelter extended to structures in which public assemblies could be held for governing, ceremonial, and religious purposes. As with early efforts of Man, these later shelters were primarily concerned with the erection of roof and walls to shield out harsh sun and foul weather. Means to heat and light the interior were added and seldom was the nature of the enclosure considered with respect to the type of heating and lighting to be utilized within the shelter.

As humankind advanced and its awareness of the overall environment of this spaceship earth and of Man's ability to wreck havoc with that environment so as to unconsciously destroy vast sectors thereof, an enthusiastic and popular movement to protect the environment, its flora, fauna, minerals and atmosphere has spread throughout the world. People are now aware that light in their home may be produced by electricity generated through the burning of coal, the burning of which pollutes the atmosphere and the mining of which has profound effects upon the earth, its water systems, and the health of the persons involved in mining the coal.

Striving for a better life has driven humankind in its development over the millennia. Humankind still seeks to better itself. But the newly acquired awareness of the fragility of the earth's environment now leads Man to more often seek a partnership with the environment so that mankind may prosper without detrimental affect to the environment. To this end, it is an objective of the present invention that a shelter shall be constructed wherein persons may assemble comfortably, free of the harsh effects of the outside environment, and do so at minimal energy costs in terms of lighting the interior of the structure and maintaining its interior at a comfortable temperature level.

Too long have structures been erected without regard for the leakage of heat into a cold outer environment or the leakage of heat from a hot outer environment into a cold structural interior. Too often has mankind created structures with dark interiors necessitating the need to expend energy to light these interiors. Too often has the light that has been added to these structural interiors added heat to an internal environment intended to be cooled so as to offer a comfortable respite from a hot outer environment.

It is therefore another objective of the invention that technology and methodology for the erection of an energy efficient structure will be disclosed such that the practice of the invention will enable the erection of structures which is so energy efficient that the costs of energy will be reduced and the savings gleaned from these reduced energy costs will more than pay the cost of erection of the structure over a reasonable minimum number of years of use of the structure.

SUMMARY DESCRIPTION OF THE INVENTION

The invention may be summarized an improvement in a shelter enclosed by walls and a roof supported by a structural framework and having an entry portal. The improvement includes having the walls and the roof comprise stressed-skin, insulated core panels. The panels have an interior and exterior facing affixed to the core so as to form a structural I-beam with the facings as flanges and the core as a distributed web uniting the flanges.

The shelter is built purposefully free of vented air spaces, all air spaces being generally enclosed to inhibit air infiltration.

The entry portal to the shelter is an air lock chamber for reducing air infiltration and energy loss as persons enter and exit the shelter. The structural framework comprises a plurality of main frames, each the main frame comprising: a first column at a first wall of the shelter; a second column at a second wall of the shelter, the second wall being opposite the first wall; and a horizontal support beam coupled to and spanning the first and second columns. The structural framework further includes a plurality of bar joists spanning between adjacent ones of the horizontal support beams of the plurality of main frames.

A first plurality of the stressed-skin, insulated panels makes up the roof and each panel being supported atop the bar joists and coupled thereto. A first plurality of horizontal frame members are each coupled to and span between adjacent pairs of the first columns. There is a second plurality of horizontal frame members each coupled to and spanning between adjacent pairs of the second columns.

A second plurality of the stressed-skin, insulated panels is hung from the first plurality of horizontal frame members as a first curtain wall, each panel being edge coupled to an adjacent panel, the panels so hung forming a first wall of the shelter;

A third plurality of the stressed-skin, insulated panels is hung from the second plurality of horizontal frame members as a second curtain wall, each panel being edge coupled to an adjacent panel, the panels so hung forming a second wall of the shelter.

A third the curtain wall forms a third enclosing wall of the shelter, while a fourth the curtain wall forms a fourth enclosing wall.

Sun-reflecting and tracking sky lights are mounted in selected ones of the panels comprising the roof. The sky lights are used for reducing electric light generated heat loads and reducing electrical utility costs during daytime hours. Selected ones of the skylights include a concentric air conditioner unit for conditioning the air temperature within the shelter.

The shelter further includes installed electrical devices. An energy power management system is coupled to selected ones of the electrical devices for monitoring and controlling the operation of the devices. There is also a reflective radiant barrier on the interior facing of the panels comprising the roof. This establishes an insulation barrier at the roof line of the shelter and contributes to maintaining the spaces below the reflective barrier at the same general temperature of the interior of the shelter.

The shelter is also claimed as the product of a process. The steps of the process include:

obtaining building code waivers and permits for the erection of a shelter constructed purposefully free of vented air spaces, with all air spaces being generally enclosed to inhibit air infiltration;

using edge coupled, stressed-skin, insulated wall panels for enclosing the peripheral bounds of the shelter;

using edge coupled, stressed-skin insulated roof panels for enclosing the roof area of the shelter;

covering the shelter's interior roof panel surfaces with a reflective radiant barrier to establish the shelter's uppermost insulation barrier at the roof line of the shelter; and lighting the interior of the shelter writhe sun-reflecting and tracking sky lights mounted in selected ones of the roof panels.

Further process steps can include:

constructing an entry portal thereto as an air lock chamber for reducing air infiltration and energy losses at the entry portal;

installing electrical devices in the shelter and coupling selected ones of the electrical devices to a power management system for monitoring and controlling the selected devices;

erecting the panels in the form of a curtain wall about the shelter; and including concentric air conditioner units as part of selected ones of the sky lights.

BRIEF DESCRIPTION OF THE DRAWINGS

FIG. 7 is a cross-sectional view of the sun reflecting skylight.

FIG. 8 shows the skylight of FIG. 7 closed for night-time heat conservation in winter months.

FIG. 9 shows the addition of a concentric air conditioner to the skylight of FIGS. 7 and 8.

DETAILS OF BEST MODE FOR CARRYING OUT THE INVENTION

Figure 1:
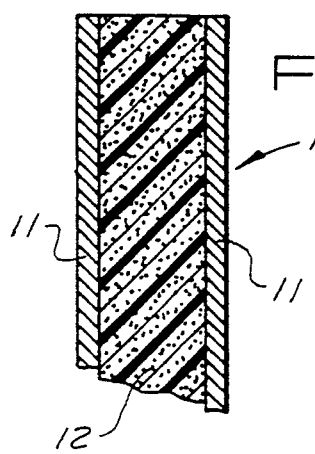
FIG. 1 is a cross-sectional view of a portion of a stressed-skin, insulated panel used in enclosing a shelter.

For purposes of promoting an understanding of the principles of the invention, reference will now be made to the embodiments illustrated in the drawings and specific language will be used to describe same. It will nevertheless be understood that no limitation of the scope of the invention is thereby intended. Alterations and modifications of the illustrated device are contemplated, as are such further applications of the principles of the invention as would normally occur to one skilled in the art to which the invention pertains.

To produce a structure which is so energy efficient that the energy cost savings achieved by virtue of the structural design will pay for the cost of the structure itself within a minimal number of years, for example five to seven years, the structure will be fabricated of stressed-skin insulated panels such as shown as cross section in FIG. 1. A typical stressed-skin insulated panel 10 comprises a panel core 12 of self-extinguishing, expanded polystyrene. Panel facings 11 are, at the time of this writing, preferably pre-painted galvanized base, steel facings. Because the stressed-skin panels can be produced on a continuous panel production line, panels 10 may be produced in any length subject only to requirements of handling and limitations imposed by mode of transport. Other panel facings 11, such as panels of aluminum, steel, etc., may be utilized.

Stressed-skin panels 10 are not only structurally sound, but have excellent qualities. For example, a two and one-half inch thick panel (65 mm) has a thermovalue of $R=10.5$ and weighs only two pounds per square foot. A four inch thick panel (100 mm) has a thermovalue, $R=16.8$, and weighs only 2.15 pounds per square foot. A panel 7.8 inches thick (200 mm) has an R value of 32.8 while a panel 13.7 inches thick (350 mm) has an R value of 57.5.

Panels 10 are preferably provided at a construction site in a pre-finished condition. For example, panel facings 11 may be of 24 gauge, G.90, grade C pre-painted galvanized steel. The surface may be painted with a siliconized polyester paint finish achieving a thickness of 0.07 to 1.0 mil after application of two coats of paint. This finish is approved by the USDA and the FDA and, with a 0.3 mil reverse coat printer, may be provided with a 20-year warranty on the finish.

The core 12 of panel 10 preferably is virgin expanded polystyrene with a minimum 1.0 lb/cu ft density. This core will have a heat transfer factor of K equal to 0.24 BTU/sq ft/hr at 40 degrees Fahrenheit mean temperature (per ASTM C-578-87a type I).

Panels 10 may be typically provided with a tongue and groove connection system for joining wall and ceiling panels together. Many mechanical devices, many of which are well known in the prior art, may be employed further to enhance the mechanical joint at the tongue and groove joining. The structural adhesive employed with panel 10 is a building code approved thermosetting, urethane adhesive system having excellent elasticity at temperatures ranging from $-50$ degrees Fahrenheit to 250 degrees Fahrenheit.

The stressed-skin insulated panel disclosed in FIG. 1 in the above discussion will have a Class-1 flame spread rating of 25 or less per ASTM E84 standards. The metal panel facings 11 as laminated to expanded polystyrene core 12 provide an excellent ignition barrier to prevent or drastically retard the spread of fire.

In this respect it should be also noted that the use of an expanded polystyrene for panel core 12 is to be greatly preferred over the use of the urethane foam. Urethane foam has been shown to out-gas CFC into the atmosphere over periods lasting as long as 120 years. The introduction of CFC into the atmosphere has been determined to be a major cause of the reduction and elimination of portions of the ozone layer which protects the earth and its inhabitants from harm from much of the ultraviolet radiated by the sun. Further, when a urethane foam is subjected to flame, it produces a deadly hydrogen cyanide gas.

Figure 2:
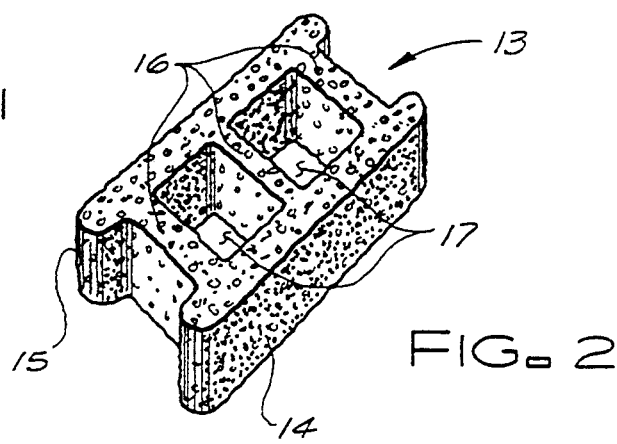
FIG. 2 is a perspective view of a concrete building block.

Typical construction techniques employed today may be exemplified by the concrete building block 13 illustrated in FIG. 2, having a thermovalue, $R=1.1$. Building block 13 has an exterior surface generally exposed to the outside environment of any structure built of such blocks 13. Block 13 has an inner face 14 which is exposed to the interior environment of a building built up of blocks 13. Cross members 16 join the exterior and the interior faces, 14 and 15 respectively, to add mechanical strength to block 13. However, cross members 16 also function as thermal bridges which act to conduct heat and tend to bring exterior face 15 to temperature equilibrium with interior face 14. Voids 17 generally have a higher insulation value than cross members 16 and the flow of heat energy across voids 17 is less than that through cross members 16.

The combination of thermal bridges made up of cross members 16 and insulating voids 17 produces an uneven heat distribution across the interior face 15 of block 13. In a building, this often leads to discoloration of the interior finish, as well as accumulation of dust upon the surfaces. It may sweat because of the differential temperature between the surface of the interior face 15 and block 13 and the room temperature and humidity.

More importantly, from an energy conserving concept, thermal bridges provided by cross members 16, because of their high conduction of energy, cause unexpected energy waste. In winter, heat from the interior surface of a structure impinging on interior face 15 is conducted through cross members 16 to exterior face 14. Heat is thus drawn from the building, and the cost of maintaining the building at a constant temperature increases. In summer when the interior of a building is being cooled, heat flows from the exterior face 14 of block 13 through thermal bridges of cross members 16 to the interior face 15. Heat radiates from the interior face 15 to the interior of the structure thus adding a burden to the air conditioning equipment and raising the cost of energy to maintain the building interior at a constant, cooled temperature.

In winter, the cool air adjacent to thermal bridge/cross members 16 can result in condensation, damage to the painted or wallpapered interior, and frequently result in the formation of mildew. So too, in the summer cooling season the wall temperatures may appear significantly warmer than the room air temperature and a person working near, or adjacent to such a wall, will be uncomfortable and highly desirous that the thermostatic settings shall be lowered to provide him with comfort. This further increases energy costs and results in the discomfort of persons who are working further removed from the warm wall surface.

Thermal bridges such as cross members 16 of block 13 exist in conventional structures utilizing building lumber, so too, in walls of poured concrete when the entire wall is a thermal bridge.

The construction techniques espoused herein is the virtual elimination of thermal bridges in the walls, floors, and ceilings of structures built with the stressed-skin insulated panel disclosed in FIG. 1 and further discussed herein below. As is frequently requested with structures utilizing the stressed-skin insulated panel of FIG. 1, a synthetic stucco is applied to the exterior panel facing 11 of the panel 10. Such a panel, here designated as 10A is illustrated in cross-section in FIG. 3. Panel 10A is, for example, a four inch thick stressed-skin, insulated panel to which a synthetic stucco 18 has been applied. Stucco finish 18 will be that surface presented to the outside of the structure built utilizing 10A. As is typical of all structural surfaces, a stagnant, laminar air film 19 imposes itself between panel 10A and the ambient air conditions adjacent to the laminar air film 19. In general, the stagnant, laminar air film 19 contributes a thermal value of $R=0.62$ to the overall thermal performance of panel 10A. Assuming an infiltration factor of one air change per hour being equivalent to 0.4 two times the volume in cubic feet of space being considered, and a loss factor of 0.16 watts per cubic foot with insulated construction of the type shown in FIG. 3, the four inch thick panel of FIG. 3 with stucco coating and interior and exterior stagnant laminar air films will have a thermal value, $R=26.24$.

From this value, a heat loss for panel 10A may be derived as equivalent to 2.28 BTU/ft$^2$. Compare this with eight inch concrete building blocks having heat loss factors of 54 or an eight inch concrete tilt up wall section with a heat loss of 93.7. Compared to the panel 10A of FIG. 3, the eight inch block building would require twenty-three times the energy utilized in a structure fabricated with panels 10A. Similarly, a building with an eight inch tilt up concrete wall would require forty times the energy when compared with a structure fabricated of panel 10A.

Similar performance is achieved when the panel 10A is utilized as a roof panel and the stucco surface 18 is replaced with a reflective aluminum membrane having a thermal value $R=10$ in summertime and $R=0.065$ in the winter. The thermal value for such a roof structure is $R=0.36.22$ in the summer and $R=26.72$ in the winter. The resulting heat losses derived are 1.65 BTU/ft$^2$ in summer and 2.24 BTU/ft$^2$ in winter.

Figure 3:
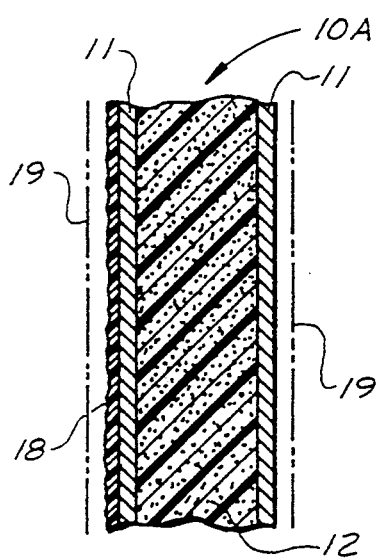
FIG. 3 is similar to that of FIG. 1 showing stucco ornamentation on an outer surface of the panel.

The panels of FIGS. 1 and 3 represent a highly efficient, energy-use reducing construction element. The panels 10 and 10A have little or no thermal bridging. The tongue and groove assembly provides superior structural tightness. These factors eliminate convection, heat losses, and make infiltration nearly non-existent. The radiant foil barrier used with the roof panels greatly reduces heat loss as well. The tightness of the construction and the drastic reduction in infiltration has a significant affect on the cost of operating a structure.

Tightness of construction and the degree of air infiltration are important considerations in determining energy consumption. It is important to note that the most efficient use of the teachings herein preclude venting of attic space and spaces between ceiling and roof.

Consider that it takes 0.018 BTU to raise the temperature of one cubic foot of air one degree Fahrenheit. The tightness of a shelter built with panel 10 or 10A when compared with a conventional lumber built house indicates that panels reduce air infiltration by one air change per hour. In a two thousand square foot structure located in a seven thousand degree day area, for example Flagstaff, Ariz., the result in energy cost during the heating season can amount to 48.4 million BTU lost per heating season. In terms of fuel dollars expended to pay for this heat loss, a tenant will pay approximately $494 per year. Thus, use of panel 10 and its variations in constructing a shelter will result in an immediate savings of almost $500 due to reduced infiltration losses. Further fuel savings are derived because of the superior insulating qualities of the panel construction.

Researchers in Sweden have developed a technique for measuring air infiltration. Several manufacturers in the United States manufacture equipment for this purpose. Basically the technique involves the pressurization of a house by use of a fan, such that the indoor air pressure is fifty pascals higher than outdoor ambient air pressure. Air flow rate, in terms of structure volume per hour necessary to maintain the fifty pascal pressure difference, is then converted to air changes per hour. A conventional lumber constructed, fiberglass insulated house has a natural infiltration rate of 0.3 air changes per hour while a shelter constructed with panels 10 has a natural infiltration rate of 0.1 air changes per hour.

In further analysis of the thermal values of a standard wood frame construction house versus the thermal values of a shelter constructed with panels 10, indicates the superior performance of panels 10 which will result in lower energy costs to maintain the ambient temperature desired within the shelter. Consider that a standard 2×6 wood frame construction consists of 2×6 studs on 16 or 24 inch centers. Typically an R-19 batt insulation is applied between the studs and a plywood sheathing forms the initial exterior surface of the structure. Building paper is usually applied over the plywood; then stucco or similar finish is applied over the building paper. Assuming thermal values $R=19$ for the insulation batt, $R=0.45$ for the interior sheet rock sheathing, $R=0.9$ for the stucco coating on the outside of the building, $R=0.06$ for the building paper between the stucco and the plywood exterior's sheathing, $R=0.62$ for the plywood sheathing interior and exterior air film with an R value of 2.5 on the exterior side and 0.62 on the interior side, the overall thermal value of the wood frame construction is computed to be $R=21.1$.

However, that value is highly theoretical. In practice you must subtract the actual external and internal environmental affects. So that when one considers the theoretically derived R value of 21.1 and reduces it for an estimated thirty per cent infiltration, ten per cent radiation, fifty per cent installation voids and ten per cent settling, the actual performance R value equals 6.

Infiltration heat losses can reduce the design R value of a structure by as much as thirty per cent. Radiation through the ceiling results in another ten per cent reduction in R value.

When using panel construction 10A, utilizing the radiation reflecting foil noted in the disclosure above, the insulation takes place at the roof line rather than at the ceiling of the room below the roof. Thus, the closed attic temperatures above the ceiling are reduced from 154 degrees Fahrenheit to 84 degrees Fahrenheit. In practical affect, this means that the temperature at the ceiling line of the room will be 78 degrees Fahrenheit rather than 100 degrees as is typical in conventional roof systems.

Voids introduced in the course of installing fiberglass batt insulation reduce the overall effective value of the insulation by as much as fifty per cent. Over a period of time insulation tends to settle. Studies have shown that batt insulation will settle by as much as 1.2 inches or approximately twenty per cent. This reduces the thermal value of the batt by ten per cent. Moisture trapped within the open celled insulation of the fiberglass batt results in a loss of insulating value. At a one per cent moisture content the insulating value is reduced by fifty per cent. Thus, an insulating batt rated at $R=30$ would only perform as an R15 insulation. Certainly more than one per cent moisture content will exist in many installations even after completion of construction and occupation of the building.

No voids, no sagging, and essentially no moisture within the expanded polystyrene core of the panels 10 and 10A, means the system performs at, or extremely close to, its actual design R value. The effectiveness of the panel construction disclosed is readily recognized; as analysis and performance on commercial buildings utilizing the structure have shown air conditioner system size can be reduced by as much as thirty five per cent.

Figure 4:
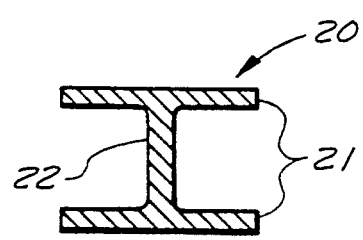
FIG. 4 is a cross-sectional view of an I-Beam.
Figure 5:
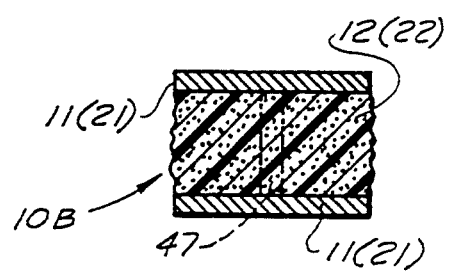
FIG. 5 is cross-section of the insulated panel showing a phantom web analogous to the structure of the I-Beam shown in FIG. 4.

The stressed-skin, insulated panels 10 and 10A are light weight and strong. Structurally they are similar to an I-Beam 20 shown in FIG. 4. I-beam 20 consists of flanges 21 joined by web 22. In the cross-section of a stressed-skin panel 10B, shown in FIG. 5, panel facings 11 function similar to flanges 21 of I-Beam 20. Core 12 acts like an extended web 22, making intimate contact with the entire inner surfaces of facings 11.

When panels 10 are employed as curtain walls and not subjected to longitudinal compression forces, no further strengthening of the panels is required. So too, in small buildings wherein the loan carried by each panel does not exceed the panel's longitudinal compressive strength, no further structural reinforcing element is required. However, when the compressive load does not exceed the nominal compressive strength of the standard panel, a spline 47', of low heat conduction characteristics, is utilized, as shown in phantom outline in FIG. 5. The combination of facings 11 and added spline 47 then provide the necessary additional panel resistance to longitudinal compression.

As earlier noted, when panels 10 are used to provide the roof for a shelter, a foil radiation barrier is used. With the insulated panels 10 and foil radiation barrier forming part of the actual roof, the insulation system is at the roof line rather than at the ceiling line of a room below the roof. This structural concept is shown is FIG. 6. See also FIGS. 13 and 14. Roof system 23 is comprised of, from the top of the illustration of FIG. 6 downward, roofing tile with an R value of 0.1, an air film 19 with an R value of 0.25, panel face 11 over interior core 12 having an R value of 27.3, and lower panel facing 11 to which is applied a foil radiation barrier 25 having a R value of 6. Beneath the foil barrier is a stagnant air film having an R value of 0.68. The roofing system 23 is supported by truss assemblies 26 and rafters 27. Addition of sheet rock or other ceiling covering 28 to rafters 27 forms an unvented, enclosed attic space 29. Sheet rock 28 has an R value of 0.45 and forms the ceiling of the room below the attic. A stagnant laminar air film 19, with an R value of 0.68, lies along the surface of sheet rock/ceiling 28. This roofing system, illustrated in FIG. 6, has a performance thermal value, $R=43.68$ in the summer months and $R=49.68$ in the winter months, when the reflective foil barrier is effective.

Most building codes require venting of attic spaces or other spaces between ceiling and roof. The teachings herein are opposed to this concept. Vented attics, and the like merely add to the heat load of the building interior.

Because the insulation in the instant system is at the roof line rather than the ceiling line, energy lost due to radiation and infiltration is reduced by as much as eighty five per cent when compared to standard wood building type of construction techniques using vented attic spaces. The actual ceiling surface temperature will be the same as the room air temperature to which sheet rock 28 constitutes the ceiling. In a conventional vented attic, wood frame construction technique a differential temperature of 22 degrees Fahrenheit is not unusual. Heat loss of the roof system taught herein is approximately 1.38 BTU/sq ft in the summer and 1.2 BTU/sq ft in the winter. This is far superior performance to that of standard roof frame construction techniques.

In the shelter proposed herein energy costs may be further reduced by bringing sunlight into the shelter during the day. To this end, a sun reflecting skylight 30 is utilized. See FIGS. 7 and 13. Skylight 30 is comprised of sun tracking mirrors 31 angled at about sixty five degrees to the horizon. A motor 42 drives mirrors 31 on bearings 41 for sun tracking purposes. The sun reflecting skylight may be a unit sold under the Trademarks So-luminaire or Sun Master by Natural Lighting Company of Glendale, Ariz., USA.

Sun reflecting skylight 30 further comprises a transparent cover 32 and a diffusion lens 34. A dead air space 33 is defined between lens 34 and cover 32. A second diffusion lens 36 positioned at the level of ceiling 28 defines, with diffusion lens 34, a second dead air space 35. Visible light rays 37, shown by dash lines, and infrared heat rays 38, shown by solid lines, strike the face of mirror 31 and are reflected downward through diffusion lens 34 where they are broken up into a multiplicity of rays by diffusion lens 34. These multiple rays are further disbursed by diffusion lens 36 and pass into the room beneath ceiling 38 to light that room. Conductive heat 39, shown by the wiggle hyphen lines, will pass through the system.

During summer days the sun reflecting skylight 30 will collect virtually all the sun's visible light and reflect into the building during morning and afternoon hours. However, because of the sun's high angle during summer mid-day hours, the mirror will cast a shadow of approximately fifteen per cent of its surface area onto the skylight. To reduce infra-red heating of objects within the building, an infra-red filter disk can be utilized during the summer months to cut down on infra-red penetration of the system.

During the winter months, because of the lower level of the sun, the sun reflecting skylight will collect and reflect all of the sun's visible light into the building throughout the entire day. In the winter, the entry of the sun's infra-red rays is an advantage since they produce radiant heat which does not require distribution by mechanical means, such as blowers, fans, or water pumps.

To preclude loss of heat on winter nights, optional hinged cover 46 may be closed as indicated in FIG. 8. With the mirror closed, heat is reflected back into the building as is artificial light which may strike the cover from the interior of the building. Because of the dead air spaces 33 and 35, the entry and exit of conductive heat is minimized.

Figure 10:
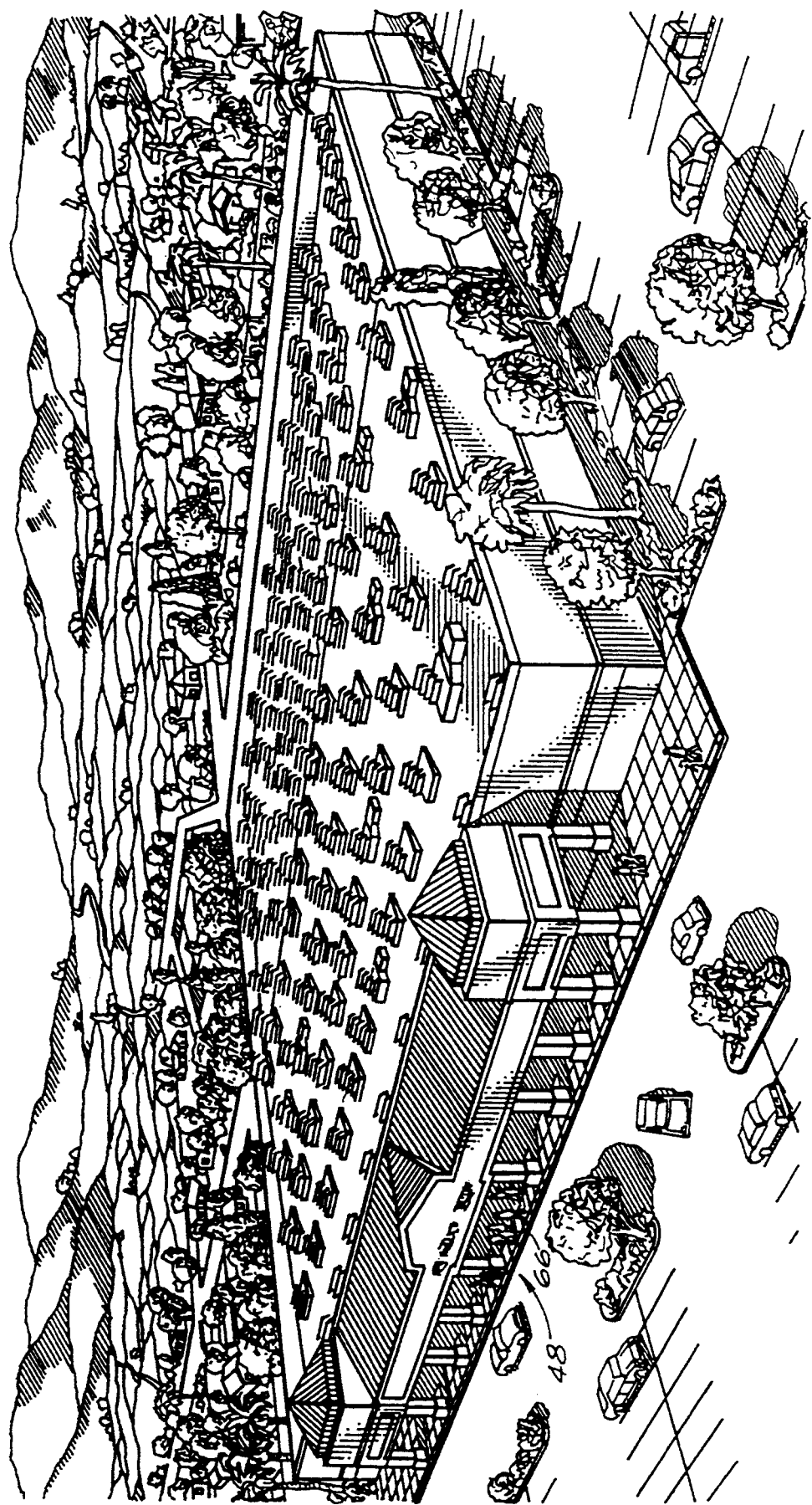
FIG. 10 is a perspective view of a building built in accord with the teachings herein.

It is anticipated that a shelter built in accord with the teaching herein will utilize a multiplicity of sun reflecting skylights 30 to provide virtually all of the interior lighting of the shelter during daytime hours. See FIG. 10. Thus, energy normally utilized to light the dim interiors of building enclosures will not be required and the costs associated with such energy will be saved. Such savings, in accumulation with heating and cooling energy savings, will pay the cost of the structure within five to seven years.

In addition to saving energy normally required to light the interior of a shelter during the daytime the use of the reflective sun skylight 30 results in reduced maintenance costs on conventional lighting fixtures. The quality of the natural light is superior to that of artificial lighting and people look more natural and healthier than they do under most artificial lighting circumstances. When the shelter utilizing sun reflecting skylights 30 is a retail outlet, the goods being sold looks superior to those presented under artificial lighting. This is especially true of fruits and vegetables. Electrical lighting equipment will produce a greater heat load on the air conditioning system than will the light produced using the sun reflecting skylight 30. In practice the electric light generated heat load will be reduced as much as fifty per cent during peak day light hours. It also true that natural light is easier on the eyes than the harsh glare of artificial or colored lighting.

Further, energy costs and maintenance savings are derived by providing sun reflecting skylight 30 with a concentric heating and cooling air conditioning unit 43. See FIGS. 9 and 14. Air conditioning unit 43 is conventional in operation and differs primarily in its structural contours being concentric about skylight 30. An example of a concentric unit suitable for use with sun reflecting skylight 30 is the unit disclosed by Robert F. Taylor in U.S. Pat. No. 5,117,811, issued Jun. 2, 1992 and titled "Concentric Lighting and Air Conditioning Fixture." Cooled air 44 enters the building and the return air 45 returns to air conditioner 43. The use of concentric air conditioning unit 43 eliminates the need for duct work above ceiling 28 and, therefore, allows lowering of the clear ceiling area height which results in a reduced shelter construction cost as well as a reduction in the installation costs of the air conditioning system. Because each concentric air conditioning unit 43 may be individually controlled, control within specified zones of the structure is possible. Control eliminates the presence of hot and cold spots throughout the shelter.

Because a multiplicity of these smaller concentric air conditioning units are utilized rather than a major central air conditioning unit, failure of one air conditioner will not result in a drastic impact on the comfort level within the shelter. A plurality of air conditioning units 43 lend themselves for ready interface with energy management systems and historically has reduced utility costs. Since sun reflecting skylight 30 and concentric air conditioner 43 come as prefabricated modules, the installation cost is less than with conventional air conditioning systems.

Refrigerant leaks with the concentric air conditioner 43 will not be catastrophic since only about ten pounds of refrigerant are required compared to fifteen hundred pounds as is necessary for the operation of a central air conditioning unit.

The use of concentric air conditioner 43 is an environmentally sound design. It reduces the electrical switch gear requirements, eliminates piping and refrigerant about the building, eliminates large remote compressors, racks and motor room. The plurality of small air conditioning units 43 substantially summertime peak energy demand charges.

Figure 11:
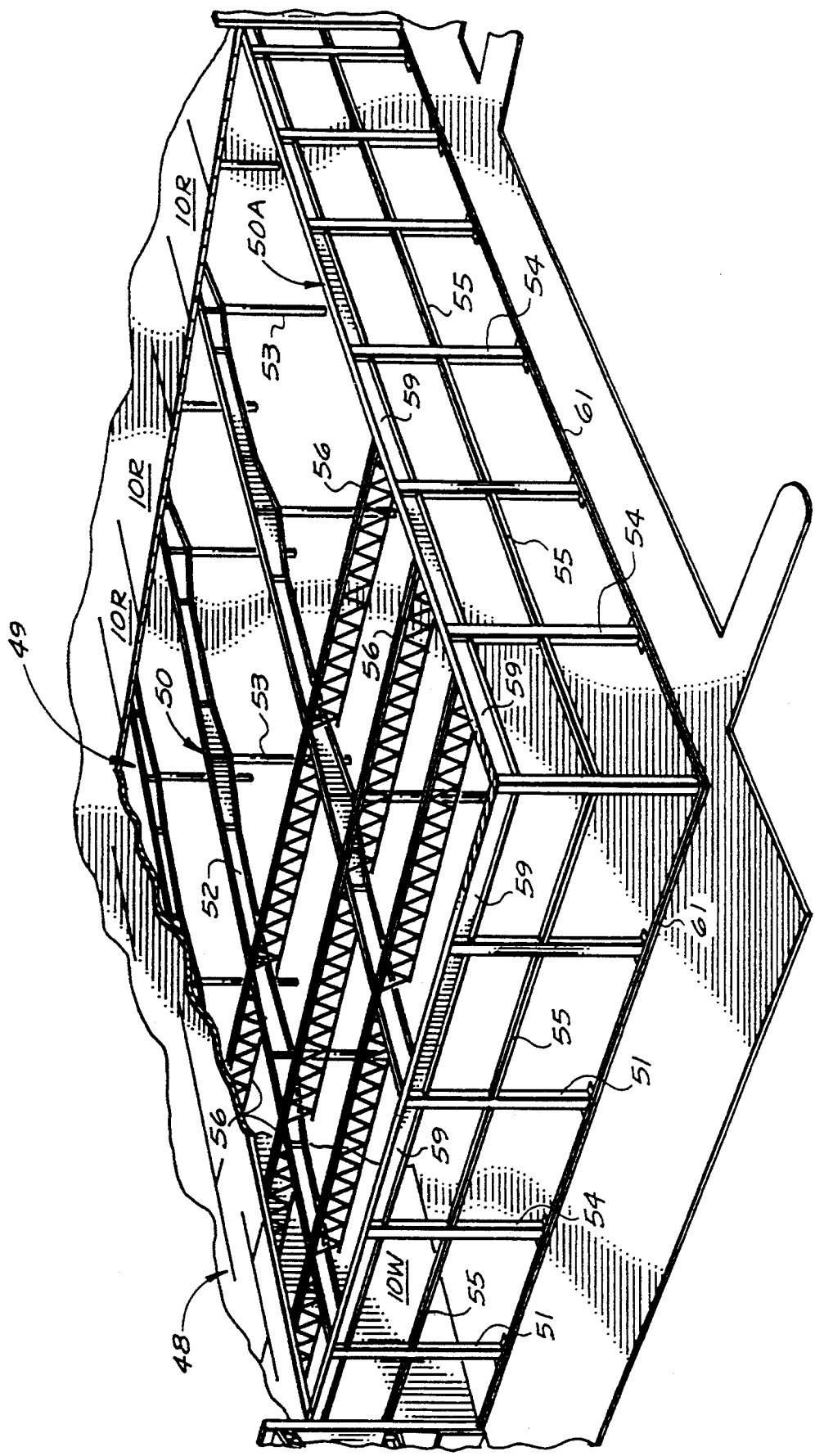
FIG. 11 is a partial cut-away, showing a portion of the steel frame structure of the building of FIG. 10.

The means and method for constructing a shelter using the technology taught herein will now be disclosed. Assume it is desired to erect a building such as that illustrated in the perspective drawing of FIG. 10. Assume that building 48 is intended for the retail sale of merchandise. It will be a generally large open structure where goods are displayed. As seen in the partial cutaway view of FIG. 11, building 48 is erected on and about a steel frame structure 49. Structure 49 comprises a plurality of main frames 50. Each of the main frames 50 has a main frame column 51 at the front wall of the building and another at the rear wall of the building, not shown in FIG. 11. A horizontal support beam assembly 52 connects the front and the rear main frame columns 51. Support for the extended length of the horizontal support beam assembly 52 is provided by steel columns 53.

Between main frames 50, along the front and rear wall of building 48, are positioned intermediate columns 54. Main frame columns 51 and intermediate columns 54 are joined by horizontal girts 55. Bar joists 56 for supporting roof panels join main frames 50 spanning the space between main frames and being oriented perpendicular to the horizontal support beam assembly 52. A plurality of intermediate columns 54 and girts 55 are positioned along the side wall in support of the end main frame 50A. Main frame columns 51 and intermediate columns 54 are anchored to the slab floor or stem wall 30 of building 48.

The joists, columns, main frames, and girts form a steel frame structure which provides the skeletal elements of building 48, to which will be attached the stressed-skin, insulated panels 10 and/or 10A of FIGS. 1 and 3.

Figure 6:
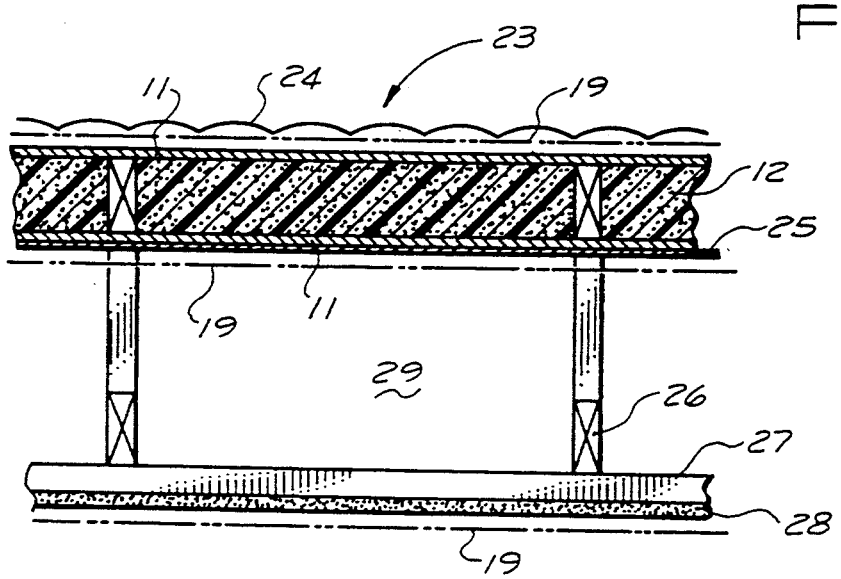
FIG. 6 illustrates the roof insulation system with insulation at the roof line rather than at the ceiling line.
Figure 12:
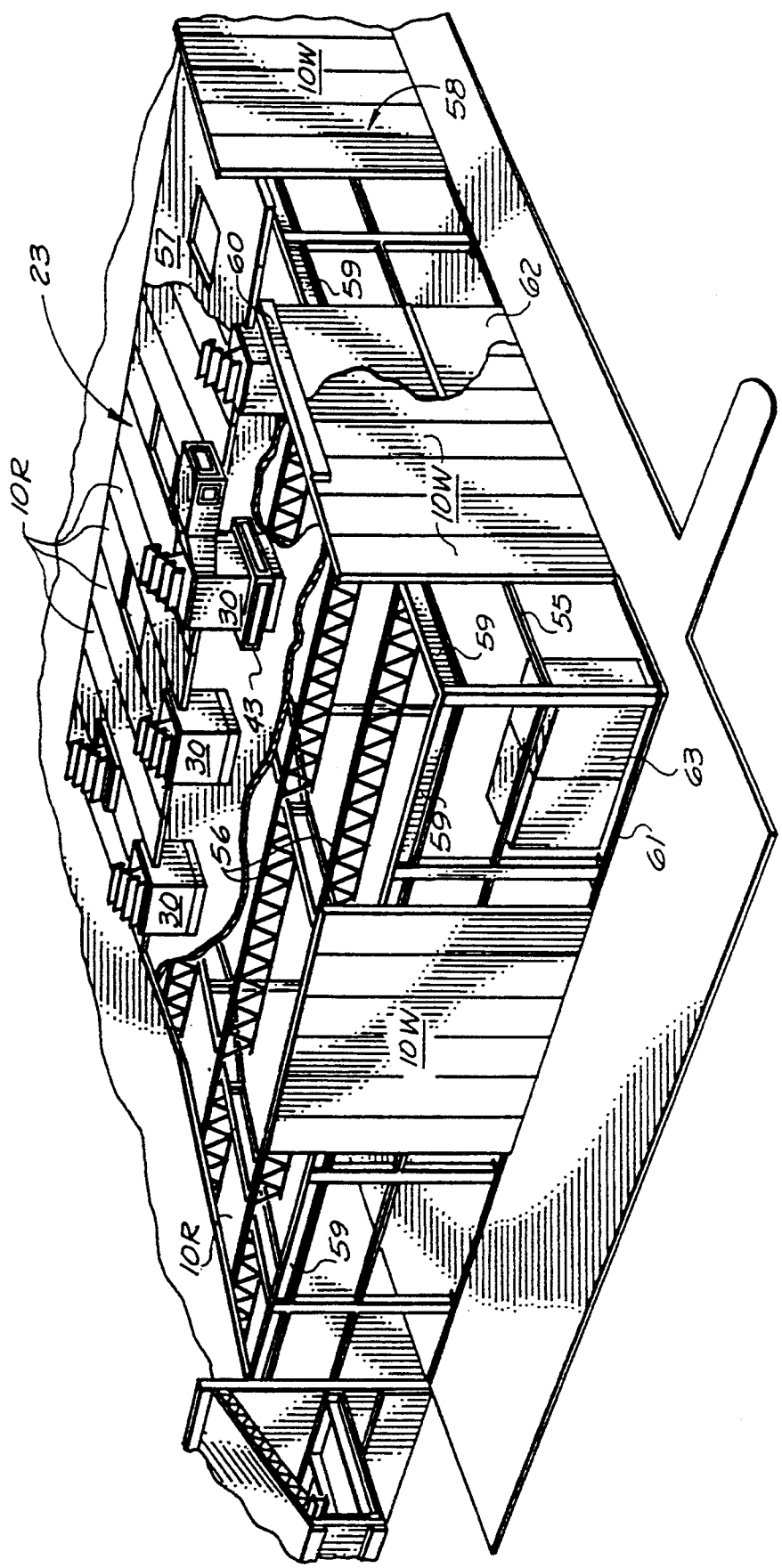
FIG. 12 shows the use of sun reflecting skylights on the roof of the building of FIG. 10, and the incorporation of concentric air conditioning units on selected ones of the skylights.

The construction of the building continues in the illustration of FIG. 12. Here, the roof insulation system 23, as earlier discussed and shown with respect to FIG. 6, is installed using roof panels 10R laid atop bar joists 56 such that panels 11 run orthogonal to bar joists 56. Ceiling panels 10 will include the radiant reflective roof membrane 25 shown in FIG. 6. With this arrangement, the insulation falls at the roof line immediately above bar joists 56. A ceiling, not shown, may be hung from, or attached to, bar joists 56.

In practice, the space enclosing bar joists 56, between the ceiling (unshown) and roof system 23 comprises an enclosed, unvented space. Because the insulation is at the roof line, the ceiling temperature will be that of the retail space within building 48, in accord with the discussion of FIG. 6. A protective roof surface covering 57 may be applied to roof panels 10R, similar, for example, to tiles 24 of FIG. 6.

Note: since the interior of roof panels 10R, like wall panels 10W, is pre-finished in an off-white or other selected color, there is really no need for a ceiling at all.

Building 48 is enclosed with a curtain wall 58 made up of wall panels 10W. Wall panels 10W are fastened to horizontal frame members 59. Wall panels 10W extend above the roof system 23 and are fastened to those roof panels 10R which abut wall panels 10W.

Wall panels 10W are positioned on footer track 61 and edge coupled tightly together so that there interlocking edges engage. The wall panels are then pinned or screw fastened to horizontal frame members 59, abutting roof panels 10R and footer 61. Thereafter, header channel 60 is fastened atop wall panels 10W to provide integral edge integrity along the multiplicity of wall panels 10W enclosing a side of building 48.

The steel frame with curtain wall of stressed-skin, insulated wall panels 10W and insulated roof system 23 of stressed-skin, insulated roof panels 10R enable the erection of a building, such as building 48, faster than conventional cement block building techniques and uses one-third less concrete for footings and stem walls. Further, one-third less steel is required when compared with standard steel frame systems requiring bar joists on twelve foot centers.

A two-coat stucco finish, in selected color, may be applied to the exterior of wall panels 10W. The building erected using the means and method taught herein will generally accrue lower construction costs than conventional built buildings.

The installation of sun reflecting skylights 30 on roof assembly 23 provides natural day-lighting of the building interior—a virtual free energy source eliminating daytime electrical lighting expenditures. Maintenance of light fixtures also is reduced compared to full-electrical lit building interiors. All the beneficial effects of natural lighting noted in discussing FIGS. 7 and 8 accrue. Further, merchandise looks better in natural light and sales are enhanced.

Figure 13:
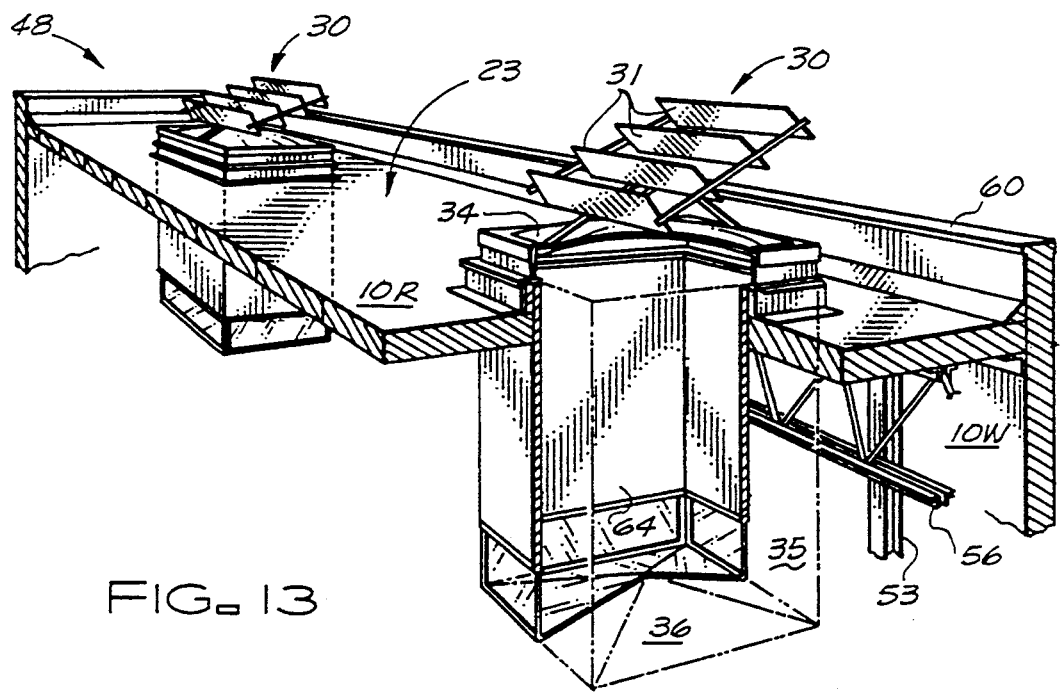
FIG. 13 is a sectional detail of a sun-reflecting skylight in a roof panel of the building of FIG. 10.

In FIG. 13 a sun-reflecting skylight 30 is shown installed in roof panels 10R of building 48. Operation of skylight 30 was earlier discussed with respect to FIG. 7. In the roof system of FIGS. 10-14, roof panels 10R sit on top of bar joists 56 which do not intrude between roof panels as do the truss elements 26 of FIGS. 7-9. Shown in FIG. 13 is light scattering material 64 lining the inner wall of dead air chamber 35.

The inclusion of selected concentric air conditioning units 43, eliminating the need for duct runs, allow lowering of clear ceiling height and thus further reduces construction costs. Being pre-fabricated, overall air conditioning costs are reduced as well when compared to a building having central air conditioning. Control of individual units 43 provides extremely efficient zone control within the building. Additional advantages, such as those notes with respect to the discussion of FIG. 9, are present as well.

Figure 14:
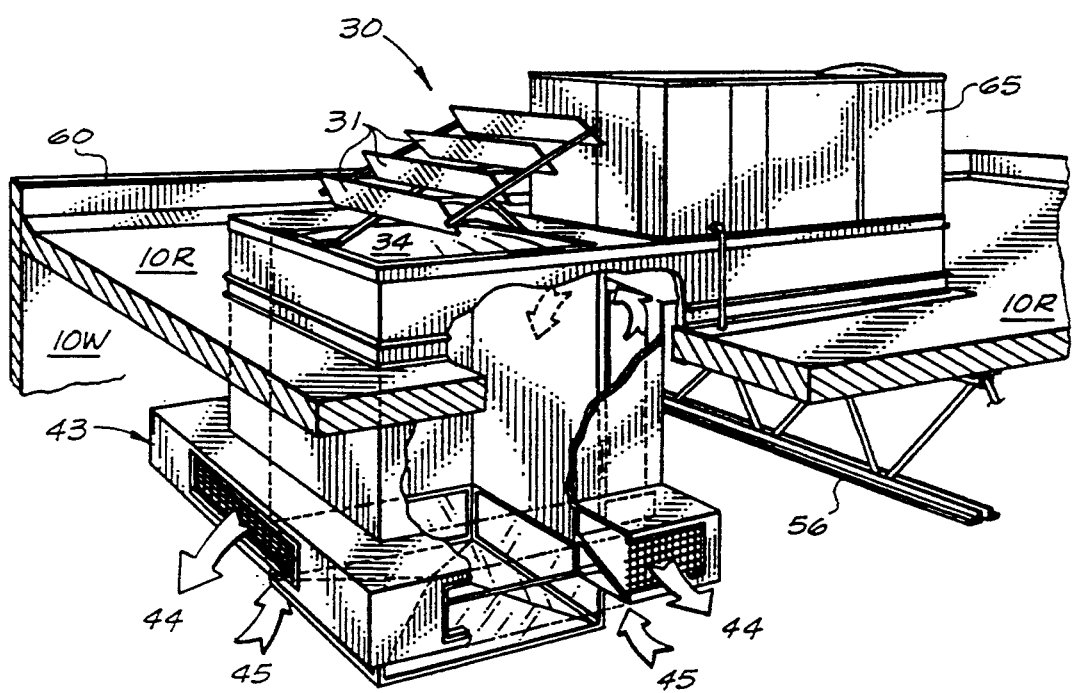
FIG. 14 is similar to FIG. 13 but includes a concentric air conditioning unit in conjunction with a sun-reflecting skylight.

In FIG. 14 the combination of a sun-reflecting skylight 30 and concentric air conditioner 43 is shown in greater detail than indicated in FIG. 9. Shown here too is the roof mounted air conditioning compressor unit 65.

Further energy usage efficiencies are derived by provision of a power management system 63 (FIG. 12) to provide state-of-the-art, custom engineering hardware and software, to monitor and/or control electrical energy usage. This system will provide the following functions:

A) Continuous Data Monitoring:
   System Performance
   Measurements recorded for analysis
   Reports abnormal operating equipment
   Predicts failures
   Reports failures B) Record Measurements in Data Base
   Pinpoints energy usage
   Equipment operating times
   Used for improving saving strategies C) Heating, Ventilating, Air Conditioning (HVAC)
   Energy Control
   Better comfort
   Monitors power consumption
   Minimizes power consumption Demand Control
Increases efficiency
Enthalpy sensing
Optimum switch over to alternate HVAC systems
D) Compliments Natural Lighting
 Controls back-up lighting and outside lighting
 Monitors sun reflecting skylight tracker for abnormal operation
 Positions tracker according to solar clock
 Prevents hunting of tracker on cloudy days
E) Other Capabilities
 Monitors store freezers and reports problems
 Factory floor control
 Security capabilities
F) Other Features
 Modular easy maintenance
 Three wire control
 Expandable
 Optional telephone monitoring
 Redundant circuits with back-up systems
 Surge and blow-out protection
 Optically isolated circuits for protection
 Auto restart after power outage Other energy efficiencies can be achieved by use of an air lock chamber at the building entrance. Such a chamber entrance 66 (FIG. 10) greatly reduces the constant HVAC energy loss at the main entrance to the building. Air curtains at loading dock areas will keep insects, dust, dirt and fumes out, as well as prevent energy loss of air conditioning and thereby reducing utility costs. Doors can remain open thereby speeding access and reducing risk of accidents. Coolers and freezers may be relocated to outside exterior walls with reach-in doors. The use of reconditioned store fixtures and cases should be considered. These are generally attractive, highly serviceable and available at attractive prices. Heat recovery systems in freezer porta-pack can supply hot water for use in the building; and, with a water filtration system, water can be sold at retail as an additional income producing item.

What has been disclosed are the means and method for constructing a shelter which repays its construction costs in energy savings over a period of five to seven years. Except for entryways, the shelter is enclosed and has no vented attic or similar spaces below its roof. Roof and walls are skin-stressed panels having a closed cell insulation core between selected structural facings, for example steel. Interior insulation is at the walls and the roof line. Any ceiling below the insulated roof line is at nominal room temperature. Natural lighting enters the shelter via sun-tracking, sun-reflecting skylights. Preferable a plurality of air conditioners, concentric about the skylights, heats and cools the interior of the shelter. An energy program manager monitors and controls electrical usage. The shelter lends itself to many building types and functions.

Those skilled in the art will conceive of other embodiments of the invention which may be drawn from the disclosure herein. To the extent that such other embodiments are so drawn, it is intended that they shall fall within the ambit of protection provided by the claims herein.

Having described the invention in the foregoing description and drawings in such clear and concise manner that those skilled in the art may readily understand and practice the invention, That which is claimed is:

1. A building construction for enclosing an interior space, said building construction comprising:
 a structural framework;
 an exterior curtain wall including stressed-skin insulated core wall panels, said panels coupled to an outer perimeter of said structural framework;
 a roof including a plurality of stressed-skin insulated core roof panels coupled atop said structural framework; and
 said interior space is enclosed by said curtain wall and said roof substantially preventing venting of interior atmosphere with ambient outer atmosphere.

2. A building construction as claimed in claim 1, wherein said stressed-skin insulated core roof and wall panels each include an interior facing, and exterior facing affixed to opposing surfaces of an insulating core, said insulating core substantially filling an area between said interior facing and said exterior facing.

3. A building construction as claimed in claim 2 wherein said shelter further includes:
 installed electrical devices; and
 an energy power management system coupled to selected ones of said electrical devices for monitoring and controlling the operation of said devices.

4. A building construction as claimed in claim 2 further comprising a reflective radiant barrier on the interior facing of said roof panels comprising said roof for maintaining an insulation barrier at the roof line of said shelter and maintaining the spaces below said reflective barrier at the same general temperature of the interior of said shelter.

5. A building construction as claimed in claim 2, further including an entry portal adopted to reduce air infiltration and energy loss as said interior space is accessed.

6. A building construction as claimed in claim 2, wherein said structural framework includes:
 a plurality of substantially parallel, spaced apart main frames;
 a plurality of joist coupled to, and spanning adjacent ones of said plurality of main frames, said plurality of stressed-skin insulated core roof panels being supported atop said joists, and coupled thereto; and
 a plurality of horizontal frame members coupling said main frames, and defining said outer perimeter of said structural framework, said stressed-skin insulated core wall panels hung from said plurality of horizontal frame members, each said wall panel being edge coupled to an adjacent said wall panel, forming said exterior curtain wall.

7. A building construction as claimed in claim 6 wherein each of said plurality of main frames includes:
 a first substantially upright column, having a top end
 a second substantially upright column having a top end
 a horizontal support beam coupled to and spanning said first and second columns proximate said top ends thereof; and
 said plurality of joist coupled between adjacent ones of said horizontal support beams.

8. A building construction as claimed in claim 6, further comprising a sun-reflecting sky light mounted in a selected one of said roof panels comprising said roof for reducing electric light generated heat loads and reducing electrical utility costs during daytime hours.

9. A building construction as claimed in claim 6, further comprising a plurality of sun-reflecting sky lights mounted in selected ones of said roof panels comprising said roof for reducing electric light generated heat loads and reducing electric light generated heat loads and reducing electrical utility costs during daytime hours.

10. A building construction as claimed in claim 8 wherein said skylight includes a concentric air conditioner unit for conditioning the air temperature within said shelter.

11. A Building construction as claimed in claim 10 wherein selected ones of said skylights include a concentric air conditioner unit for conditioning the air temperature within said shelter.

12. A method of building a shelter for enclosing an interior space, said method comprising the steps of:
   erecting a structural framework;
   attaching a plurality of stressed-skin insulated core wall panels to an outer perimeter of said structural framework to form an exterior curtain wall; and
   coupling a plurality of stressed-skin insulated core roof panels atop said structural framework to form a roof.

13. A method as claimed in claim 12 further including the step of covering an inner and outer surface of each of said stressed-skin insulated core roof panels with a reflective radiant barrier to established an uppermost insulated barrier at the roof line of said shelter.

14. A method as claimed in claim 12, wherein erecting said structural framework includes:
   placing a plurality of substantially parallel spaced apart main frames;
   spanning adjacent ones of said plurality of main frames with a plurality of joists atop which said plurality of roof panels are supported; and
   coupling adjacent ones of said plurality of main frames with a plurality of horizontal frame members, said horizontal frame members defining an outer perimeter, and to which said wall panels are attached in an edge coupled manner.

15. A method as claimed in claim 12 further including constructing an entry portal in said exterior curtain wall, adopted to reduce an infiltration and energy loss as said interior space is accessed.

16. A method as claimed in claim 12 further comprising mounting sun-reflecting and tracking sky lights in selected ones of said roof panels.

17. A method as claimed in claim 12 further including installing electrical devices in said shelter and coupling selected ones of said electrical devices to a power management system for monitoring and controlling said selected devices.

18. A method as claimed in claim 12 further including installing concentric air conditioner units as part of selected ones of said sky lights.

19. A method as claimed in claim 12 further including pre-manufacturing said roof and wall panels, prior to building said shelter.

* * * * *